United States Patent [19]
Vandenberg

[11] Patent Number: 5,690,353
[45] Date of Patent: Nov. 25, 1997

[54] SUSPENSION SYSTEM WITH IMPROVED BEAM

[75] Inventor: Ervin K. Vandenberg, Massillon, Ohio

[73] Assignee: Suspensions Incorporated, Canal Fulton, Ohio

[21] Appl. No.: 647,220

[22] Filed: May 9, 1996

[51] Int. Cl.$^6$ .............................. B60G 11/28; B60G 7/00
[52] U.S. Cl. ........................................ 280/688; 280/711
[58] Field of Search ............................. 280/711, 713, 280/688, 725, 683

[56] References Cited

U.S. PATENT DOCUMENTS

| | | | |
|---|---|---|---|
| 4,166,640 | 9/1979 | Van Denberg | 280/711 |
| 5,037,126 | 8/1991 | Gottschalk et al. . | |
| 5,366,237 | 11/1994 | Dilling et al. | 280/711 |
| 5,375,871 | 12/1994 | Mitchell et al. | 280/688 |

OTHER PUBLICATIONS

The Weight is Over, Neway Genuine Light Trailer Air-Ride, Neway Corp.
SAE—SAE Technical Paper Series, Society of Automotive Engineers, Inc., pp. 1-12.

Primary Examiner—Paul N. Dickson
Attorney, Agent, or Firm—Sand & Sebolt

[57] ABSTRACT

A vehicle suspension system having a pair of hanger brackets and a pair of beams. A first end of each beam is pivotally attached to each hanger bracket, and an axle is rigidly attached to the second end of each beam. A tri-functional bushing is positioned at each pivot to provide a horizontal spring rate different from the vertical spring rate. Each beam is formed with a top section and a bottom section which are joined along the longitudinal axis. Both the top section and bottom section are formed with axle recesses complementary related to a portion of the axle. Each axle recess is formed with a trailing edge positioned on either side of a arcuate section of the axle. In one embodiment, a rear plate extends downwardly from the top section adjacent the front of the axle and is welded thereto. In another embodiment, a half sleeve is positioned circumferentially around a front portion of the axle and is complementary related to the axle recesses of the top section and the bottom section. In this embodiment, a portion of the half sleeve adjacent the neutral axis is removed, and a plug weld is positioned therein to secure the half sleeve to the axle and a weld bead is provided circumferentially around the half sleeve adjacent the axle recesses formed in the top section and bottom section to secure the trailing beam to the half sleeve.

20 Claims, 7 Drawing Sheets

SUSPENSION SYSTEM WITH IMPROVED BEAM

BACKGROUND OF THE INVENTION

1. Technical Field

The invention relates generally to an improved vehicle suspension system. More particularly, the invention relates to a beam type suspension system which provides an axle to beam connection which is both lightweight and simple to manufacture. Specifically, the invention relates to a suspension system having an upper portion and a lower portion welded to the axle with the beam extending only partially around the axle.

2. Background Information

The trucking industry has witnessed a dramatic increase in the cost associated with transporting goods. Additionally, weight restrictions on over-the-road trucks have become increasingly stringent. These changes in the trucking industry have pointed to a need for suspension systems that are lightweight and which safely support increasingly larger loads.

Suspension systems may take a variety of forms, including parallelogram suspensions, and leading and trailing beam type suspensions. Generally, leading and trailing beam type suspensions include a pair of longitudinally extending beams which may be either flexible or rigid, one of which is located adjacent each of two longitudinally extending frame rails located beneath the body of the truck or trailer. These beams are pivotally connected at one end to a hanger bracket extending downwardly from the frame, with an axle extending between the beams adjacent the other end. Additionally, an air or coil spring is generally positioned intermediate each frame rail and a corresponding beam. The beam may extend forwardly or rearwardly of the pivot, thus defining a leading or trailing beam suspension respectively.

Beam type suspension systems are used on a significant number of trucks and trailers, and must have sufficient strength to resist lateral and axial deflection while remaining stable. Lateral forces act on a suspension system in a variety of ways with the most common being that lateral forces act on a suspension as a vehicle negotiates a turn. As the vehicle turns, sheer stress acts between the tire and the road surface causing a lateral stress to be transferred through the tire wheel assembly to the axle. The axle, being rigidly attached to the suspension, transfers the lateral force into the beam causing it to deflect laterally. This lateral deflection can be extreme, and under certain loading conditions, can cause the tires to contact the vehicle frame rails.

Roll stability refers to the counter-acting forces operating on the ends of an axle causing one end of the axle to raise relative to the frame a distance greater than the other end of the axle. Roll instability is encountered when the vehicle frame tilts or rolls excessively relative to the axle; for example, when the vehicle negotiates a turn such that the centrifugal and acceleration forces reduce the downward forces acting on the inside wheel of the turn, and increase the downward force acting on the outside wheel of the turn to the point of loss of vehicle control. Some roll flexibility is required to allow the axle to move relative to the frame; for example, during diagonal axle walk.

Diagonal axle walk occurs when the wheels at the opposite ends of the axle encounter unlike irregularities in a road or off-the-road surface, such as when one wheel rides over a curb. As the wheel rides over the curb, an upward force acts on that wheel, and a counteracting downward force acts on the wheel not riding over the curb. If the suspension is unable to provide flexibility between the axle and the frame as the tire wheel assembly travels over the curb or ground irregularity, or alternatively to provide flexibility between the axle and the frame as the vehicle negotiates a turn, the suspension will be roll rigid, and may cause axle breakage or over stress vehicle components such as the frame.

Roll rigid suspensions are used to stabilize high center of gravity vehicles such as highway trailers. In these applications, only enough roll compliance is permitted to allow the axle suspension to negotiate uneven terrain without unduly stressing the vehicle frame or axle. Typically, the roll angles of axle to frame are limited to 2 to 3 degrees in roll rigid suspensions. That is, if all the load were transferred to the tire or tires on one side of the vehicle and the tire or tires on the other side of the vehicle are completely off the ground, the angle of the axle relative to the frame reaches only about 2 to 3 degrees for a typical roll rigid suspension.

Conversely, roll flexible suspensions are used on low height vehicles and multi-axle vehicles which are stabilized with other suspensions. In these situations, the flexible suspensions operate to merely increase the load carrying capacity of the truck. In these applications, tractive effort and load support are paramount as a flexible suspension allows the tires to remain in contact with the ground. The tires must remain in ground contact to assure that the increased carrying capacity of the vehicle is evenly transmitted through the frame to the ground without inducing undue stress to the vehicle frame structure. Regardless of whether a roll rigid or roll flexible suspension is utilized, the suspension must be roll stable and provide the proper roll and lateral control needed to assure that the total vehicle is stable.

Traditionally, truck and trailer suspensions employ a resilient axle-to-beam connection, or alternatively the suspension includes a flexible, or spring beam in order to successfully take up vertical forces experienced during vehicle operation. Alternatively, U.S. Pat. No. 4,166,640 provides a tri-functional resilient pivotal connection between the beam and the hanger bracket to provide a greater degree of deflection in response to centrifugal and acceleration forces and a lesser degree of radial deflection in response to forces acting along the axial length of the beam. The '640 reference thus provides a rigid beam in combination with a rigid axle to beam connection with the resilient bushing attaching the beam to the frame responding to vertical forces acting on the axle to create a roll stable suspension.

A rigid axle to beam connection may be used when the tri-functional bushing described above is used to connect the rigid beam to the frame. Inasmuch as bushings, and consequently mounting plates and mounting pins are not required for rigid axle to beam connections. Suspension systems with rigid axle to beam connections may be manufactured substantially lighter than suspension systems requiring resilient axle to beam connections. Additionally, rigid beams are less expensive to manufacture than spring beams and thus rigid beam suspensions are less expensive than spring beam suspensions.

U.S. Pat. No. 5,037,126 employs the basic concept of a tri-functional bushing shown in the '640 patent, and provides a rigid axle-to-beam connection.

Additionally, U.S. Pat. No. 5,366,237 discloses a rigid axle to beam connection in combination with a rigid beam and tri-functional bushing. The '237 reference was developed in order to prevent the axle from stressing to an out-of-round cross-sectional configuration as a result of vertical forces imparted to the axle through centrifugal and acceleration forces as well as through diagonal axle walk. While the '237 reference is presumably adequate for the purpose for which it was intended in that it provides a rigid axle to beam connection, the weight of the suspension may still be reduced, and the axle to beam connection disclosed therein is somewhat difficult to assemble. Specifically, the axle must be slid into the orifice formed in each of the beams, substantially increasing production time, and consequently production costs.

The need thus exists for a beam which may be formed to receive an axle through a rigid axle to beam connection. Two-part beams have been known for some time, and specifically, the Neway® AR-90 trailer air suspension manufactured by Neway® of Muskegon, Mich. utilized a two-part beam having a vertical weld. While the Neway® AR-90 trailer air suspension was presumably adequate for the purpose for which it was intended, the vertical weld required that the beam was formed by utilizing a butt joint which must be accurately manufactured thereby substantially increasing manufacturing costs for the air suspension system. Additionally, the vertical weld of the AR-90 air suspension was positioned on the top and bottom beam plates. As a result, the weld attaching the right and left side of the beam in the AR-90 air suspension was positioned away from the neutral axis, and therefore receives the maximum bending stresses felt by the beam thereby substantially reducing the life expectancy of the AR-90 air suspension.

One problem associated with rigid axle-to-beam connections is that the warranty on the axle will be voided if a weld is positioned within 1.5 inches of the vertical axis on either the top or the bottom of the axle. Welding in this area is forbidden by the axle manufacturer as these areas receive the largest compression and tension forces felt by the axle.

The need thus exists for a rigid axle to beam connection which may be utilized with a rigid beam which provides a roll stable suspension, and which is resistant to lateral and longitudinal or axial forces. The need also exists for a suspension system which provides an axle to beam connection which is lightweight, easy to assemble and simple to manufacture.

SUMMARY OF THE INVENTION

Objectives of the invention include providing a vehicle suspension system which is roll stable, and resistant to lateral and longitudinal forces.

Another objective is to provide a vehicle suspension system with a rigid axle to beam connection which is lightweight.

A further objective is to provide a vehicle suspension system whereby each beam is formed with upper and lower nested portions.

A still further objective is to provide a vehicle suspension system in which the upper and lower portions of each beam are assembled only partially around an axle to form a rigid axle to beam connection with the welds attaching the axle to the beam positioned substantially adjacent the neutral axis of the axle.

Yet another objective is to provide a vehicle suspension system which utilizes a tri-functional bushing.

Still another objective is to provide a vehicle suspension system in which the axle is attached to each beam by a weld extending adjacent the front and adjacent the rear of the axle.

Yet a further objective is to provide a vehicle suspension system which will operate equally well on most vehicles.

Another objective is to provide a vehicle suspension system which permits the cross-sectional configuration of the axle to vary when moving from a stressed to a non-stressed condition.

A still further objective is to provide a vehicle suspension system which includes a sleeve extending only partially around the front of the axle.

A still further objective is to provide such a vehicle suspension system which is of simple construction, which achieves the stated objectives in a simple, effective and inexpensive manner, and which solves problems and satisfies needs existing in the art.

These and other objectives and advantages of the invention are obtained by the improved vehicle suspension system, the general nature of which may be stated as including a pair of spaced apart beams, each having a first end, a second end, a top section and a bottom section; each top section and bottom section having a pair of sidewalls; pivot means attached to the first end of each beam for pivotally mounting each beam to the frame; weld means extending longitudinally along each beam intermediate the first end and the second end for attaching the sidewalls of the top section to the sidewalls of the bottom section; an axle; and connection means for connecting the axle to each beam adjacent the second end of each beam.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
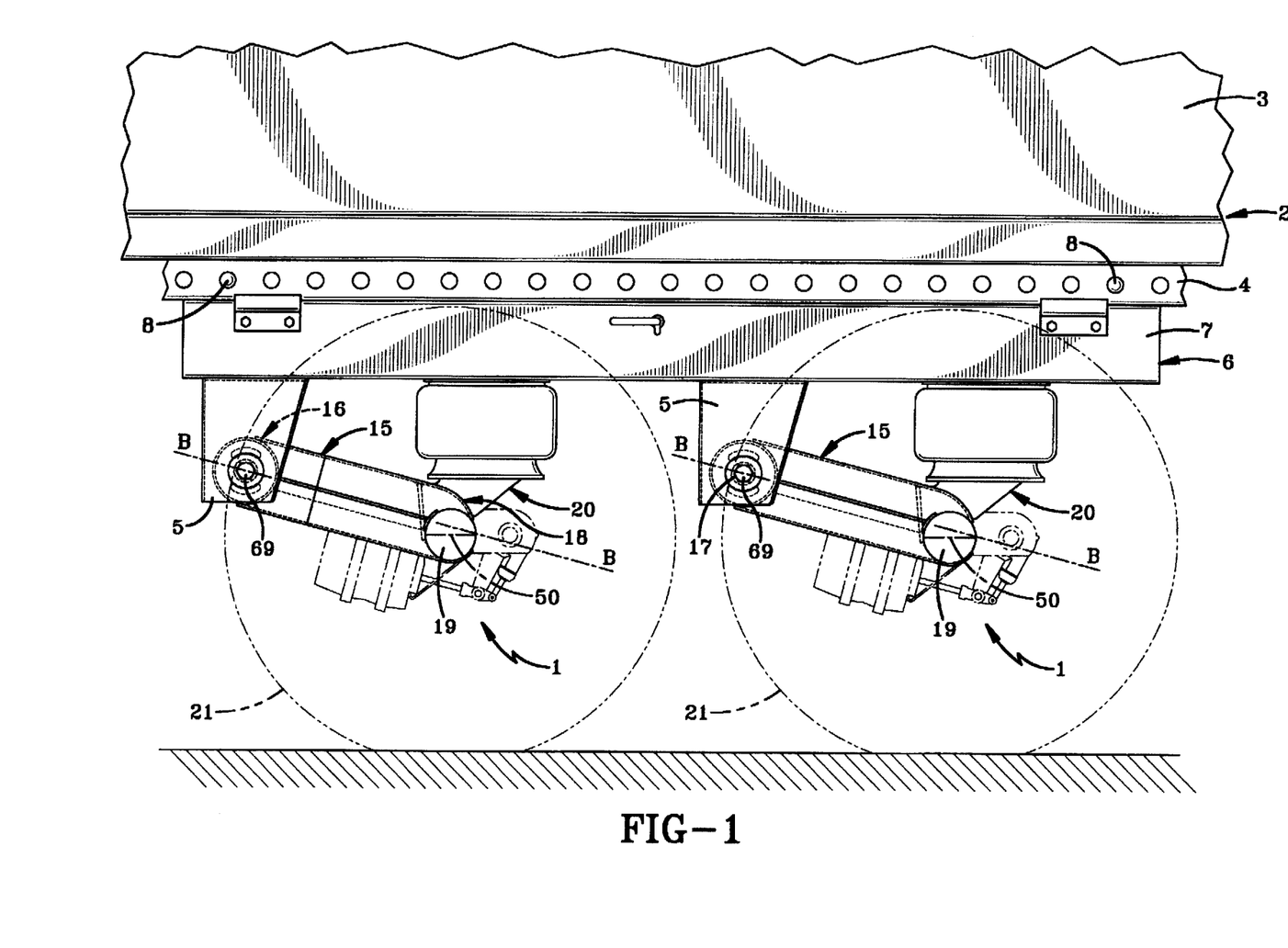
FIG. 1 is a side elevational view of a pair of vehicle suspension systems with the tires and brake assemblies shown in dot-dash lines, and shown attached to a vehicle.
Figure 2:
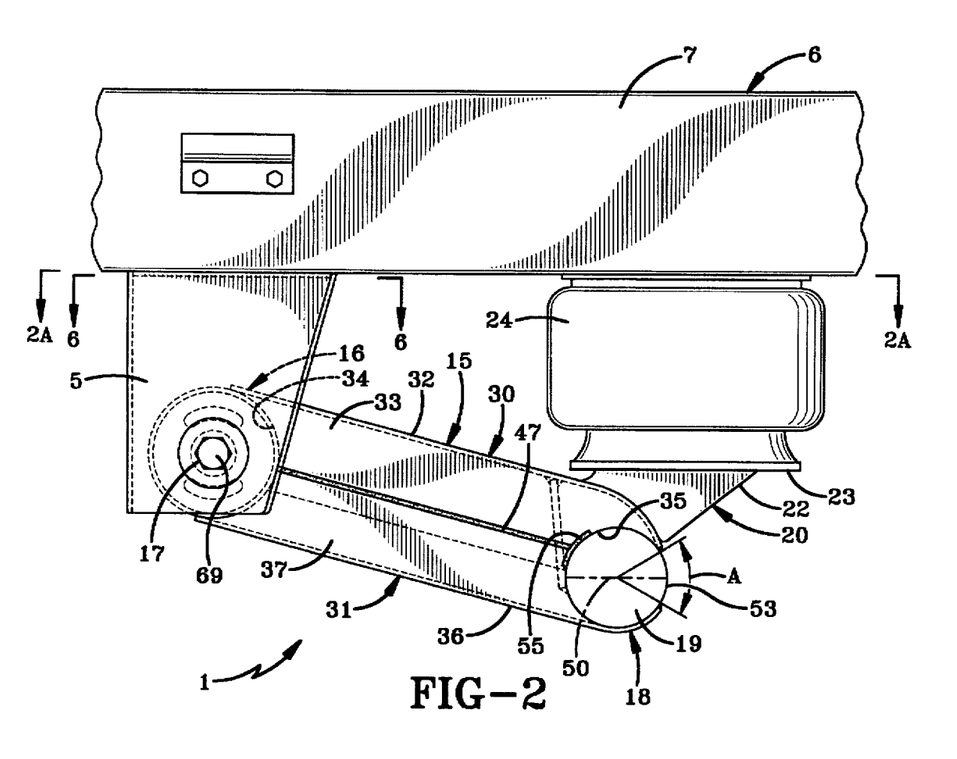
FIG. 2 is an enlarged side elevational view of one of the vehicle suspension systems shown in FIG. 1 with portions shown in dot-dash lines.
Figure 7:
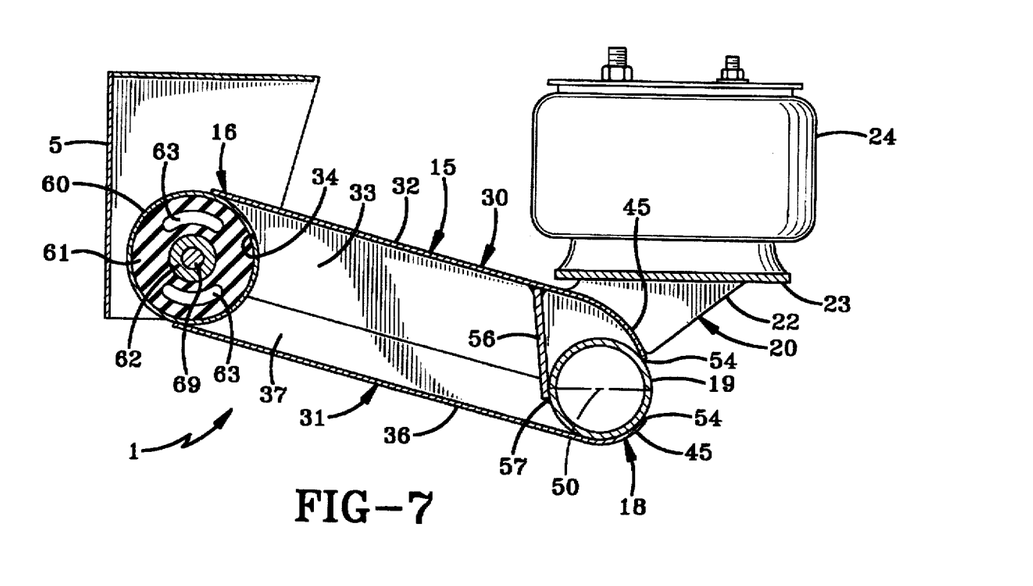
FIG. 7 is a sectional view taken along line 7—7, FIG. 2.

The improved vehicle suspension system of the present invention is indicated generally at 1, and is particularly shown in FIGS. 1, 2 and 7 mounted on a vehicle 2, such as a truck or trailer. Vehicle 2 includes a cargo box 3 supported by a pair of frame rails 4 extending longitudinally beneath cargo box 3 and along the length of vehicle 2. Suspension system 1 includes a pair of hanger brackets 5 welded to a slider frame 6 which includes a pair of parallel and spaced apart slide channels 7. Slide channels 7 are spaced apart a distance equal to the distance between frame rails 4 and are mounted to frame rails 4 with a plurality of locking pins 8. Referring to FIG. 1, a pair of identical suspension systems 1 are shown installed on vehicle 2 with only one being described in detail hereinbelow.

Figure 2A:
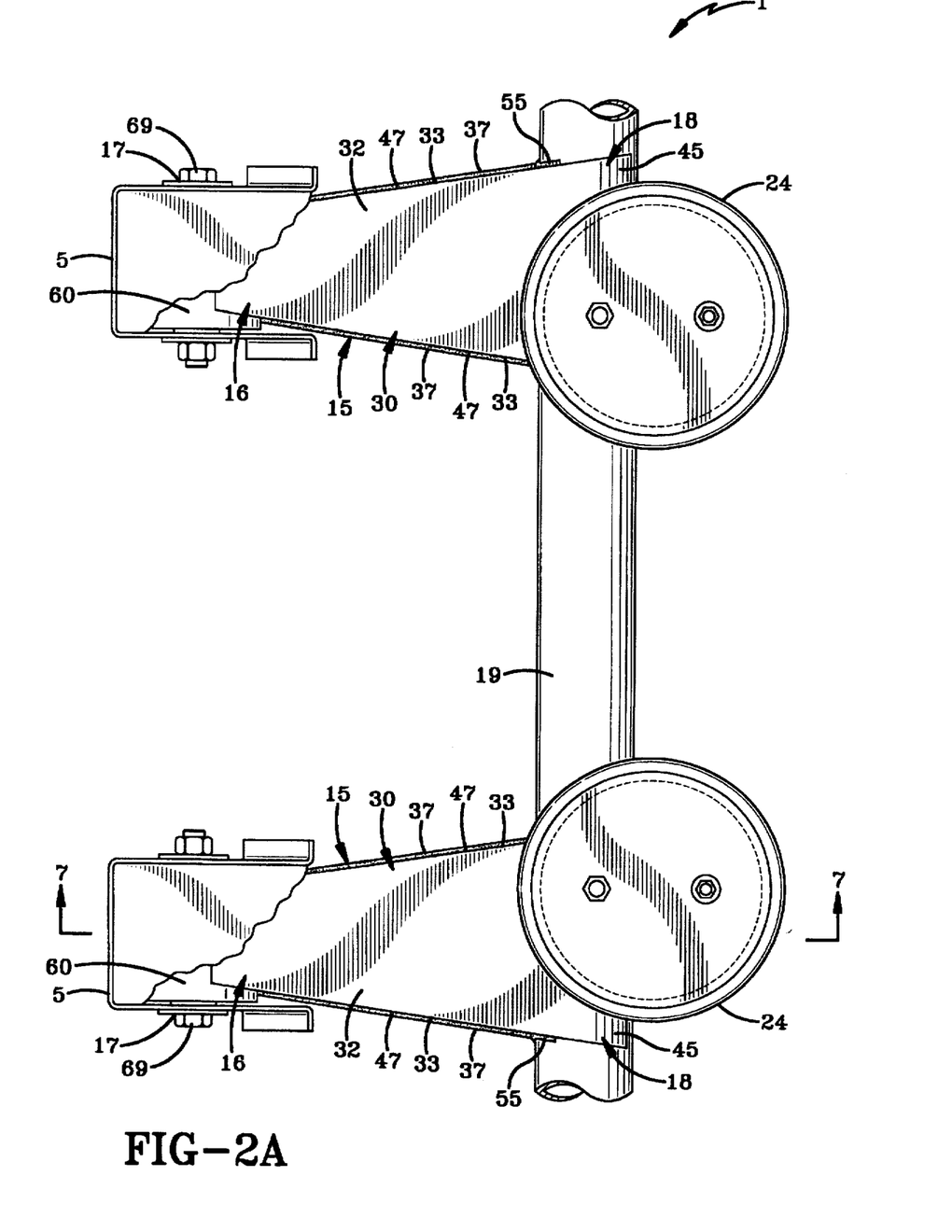
FIG. 2A is an enlarged top view of the vehicle suspension system shown in FIG. 2.
Figure 3:
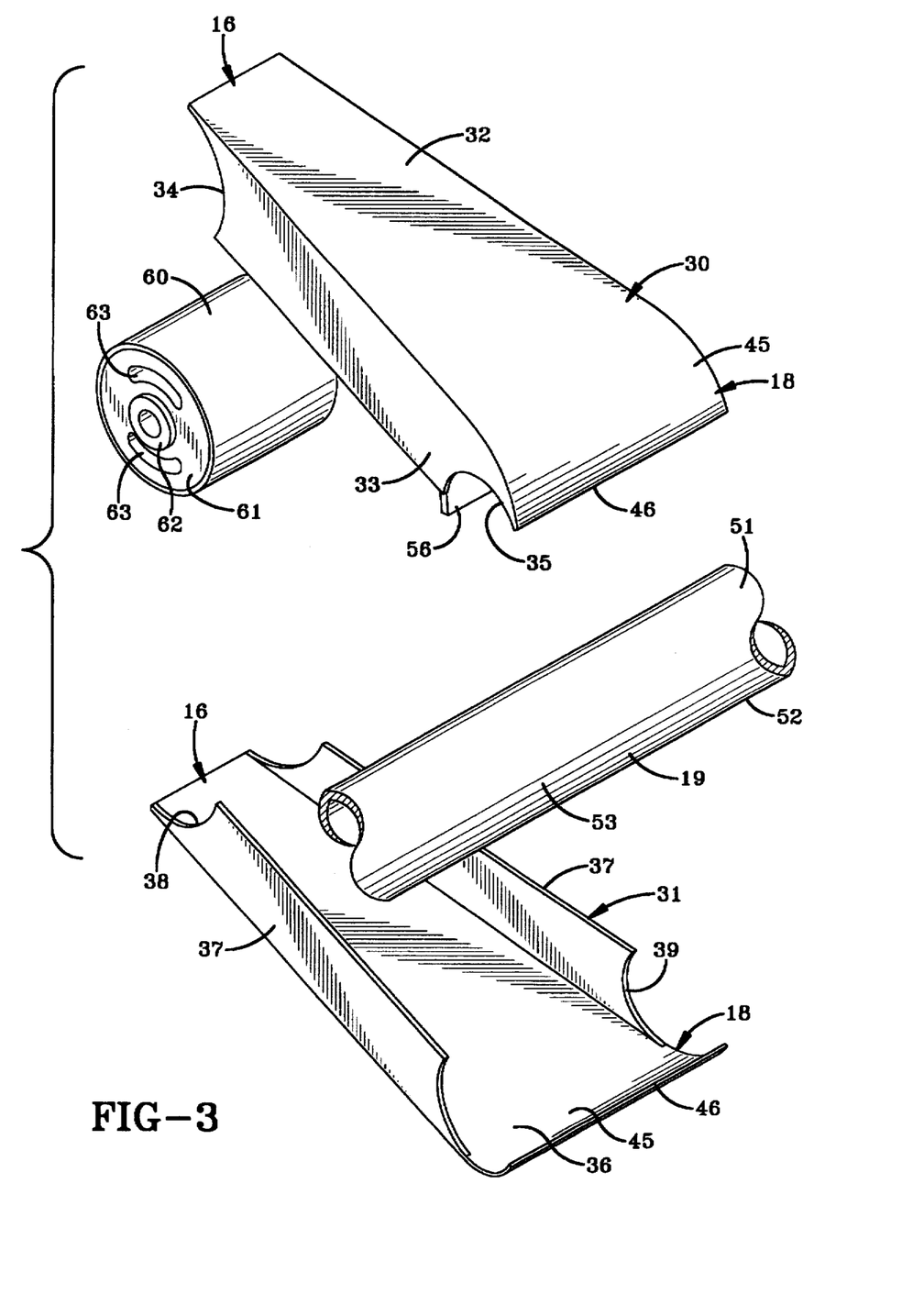
FIG. 3 is an enlarged exploded perspective view of one beam of one of the vehicle suspension systems shown in FIG. 1 with the axle broken away and in section.

Suspension system 1 includes a pair of parallel and spaced apart trailing beams 15 (FIG. 2A). Inasmuch as trailing beams 15 are identical, only one will be described in detail hereinbelow. Each trailing beam 15 is formed with a neutral plane B (FIG. 1), which experiences the minimum strain as a result of bending moments imparted on trailing beams 15 during use. A first end 16 of each trailing beam 15 is mounted to a respective hanger bracket at a pivot 17, and a second end 18 of each trailing beam 15 is welded to an axle 19. A mounting bracket 20 is mounted to second end 18 of trailing beam 15. Referring to FIG. 2, mounting bracket 20 includes a pair of lower flanges 22, and an air spring mounting plate 23. An air spring 24 is interposed between air spring mounting plate 23 and slider frame 6 for supporting vehicle 2 and vertical loads associated therewith. Each end of axle 19 has a tire-wheel assembly 21 rotatably mounted thereon.

In accordance with one of the main features of the present invention, each trailing beam 15 is formed with a top section 30 and a bottom section 31. Referring to FIGS. 2–5, top section 30 is formed with a top wall 32, and a pair of parallel and spaced apart sidewalls 33. Sidewalls 33 are substantially vertical, and perpendicular to top wall 32. Each sidewall 33 is formed with an arcuate edge 34 adjacent first end 16 of trailing beam 15 and an arcuate axle recess 35 adjacent the second end 18 of trailing beam 15. Similarly, bottom section 31 is formed with a bottom wall 36 and a pair of parallel and spaced apart sidewalls 37. Sidewalls 37 are vertical, and substantially perpendicular to bottom wall 36. Each sidewall 37 is formed with an arcuate edge 38 adjacent first end 16, and an axle recess 39 adjacent second end 18 of trailing beam 15. Top wall 32 and bottom wall 36 are formed with an arcuate portion 45 terminating at a trailing edge 46. Arcuate portion 45 is complementary related to a portion of axle 19.

In accordance with another feature of the present invention, sidewalls 33 of top section 30 are spaced apart a distance equal to the distance between the interior surface of sidewalls 37 of bottom section 31 thereby forming a longitudinal joint line between sidewalls 37 and 33. A weld bead 47 (FIGS. 4 and 5) is then placed along the longitudinal joint line thereby securing top section 30 to bottom section 31. Specifically, top section 30 is nested into bottom section 31 such that sidewalls 37 and 33 overlap. Top section 30 and bottom section 31 are most economically manufactured by stamping or drawing whereby the edges of sidewalls 33 and 37 are not accurately trimmed or sized. If sidewalls 33 and 37 were abuttingly engaged, the edges thereof would have to be trimmed, or accurately sized to assure a strong weld 47. However, inasmuch as sidewalls 33 and 37 overlap, a strong weld 47 may be positioned therebetween even thoughtop section 30 and bottom section 31 have been economically manufactured by stamping or drawing with uneven edges. Weld 47 attaches sidewalls 33 and 37 along the overlapped joint adjacent neutral plane B of each trailing beam 15. In this manner, welds 47 experience the minimum strain as a result of bending moments imparted to beams 15 as the neutral axis is put in neither compression nor tension as a result of such bending moments during normal operation. While trailing beams 15 may take a variety of sizes and configurations, in the preferred embodiment, they are tapered outwardly from first end 16 towards second end 18 to limit the lateral deflection of suspension system 1 and to increase deflection resistance as a result of torque forces imparted to axle 19. Axle 19 is positioned within axle recesses 35 and 39.

Figure 4:
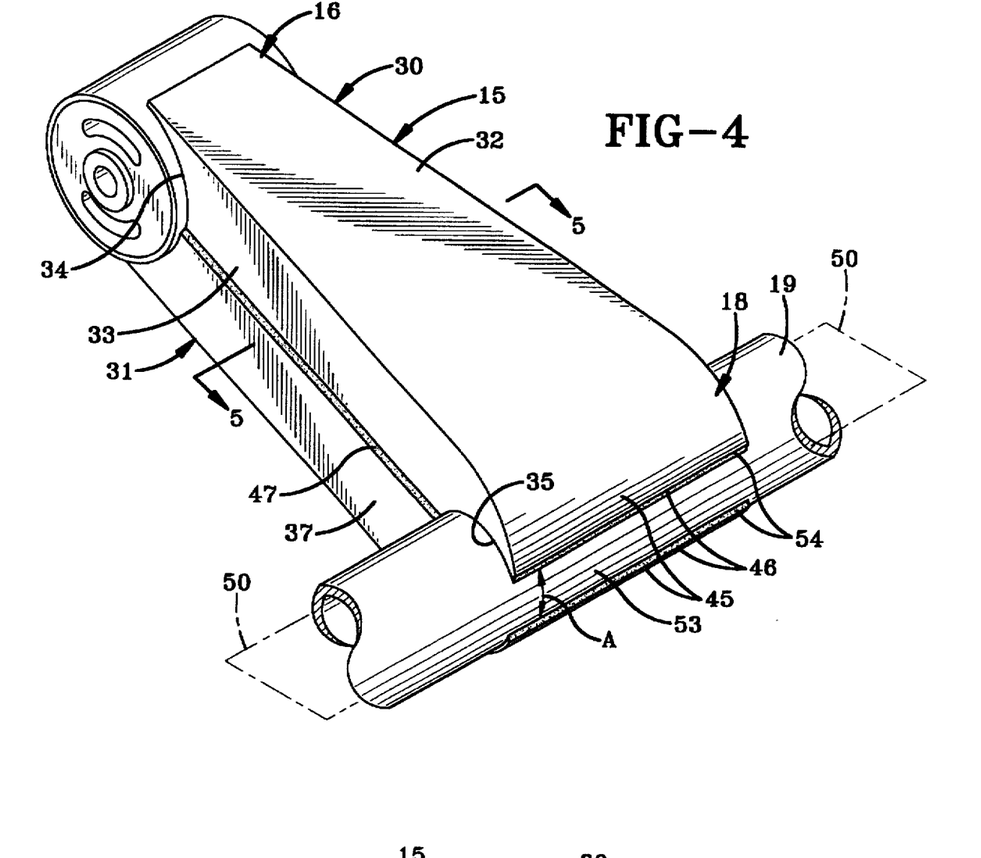
FIG. 4 is an enlarged assembled perspective view of one of the beams of the vehicle suspension system shown attached to an axle broken away and in section.
Figure 5:
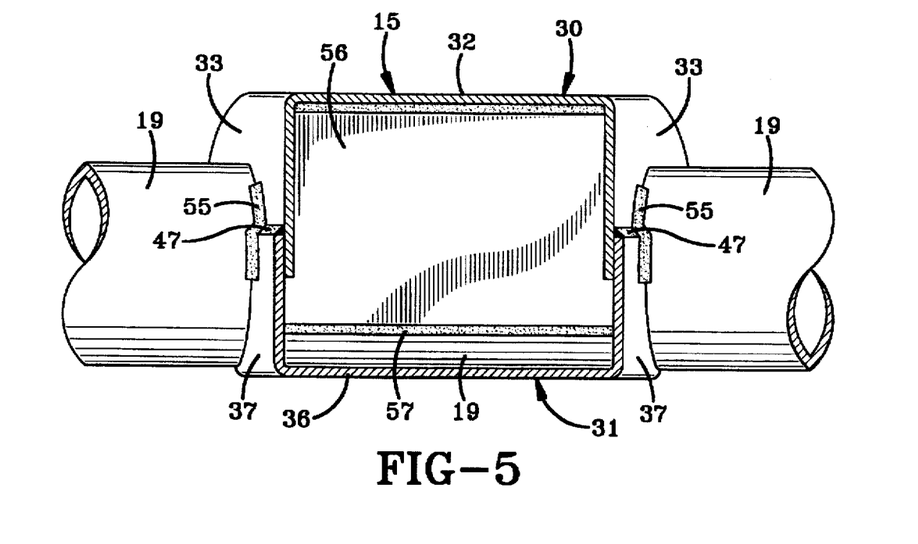
FIG. 5 is a sectional view taken along line 5—5, FIG. 4.
Figure 6:
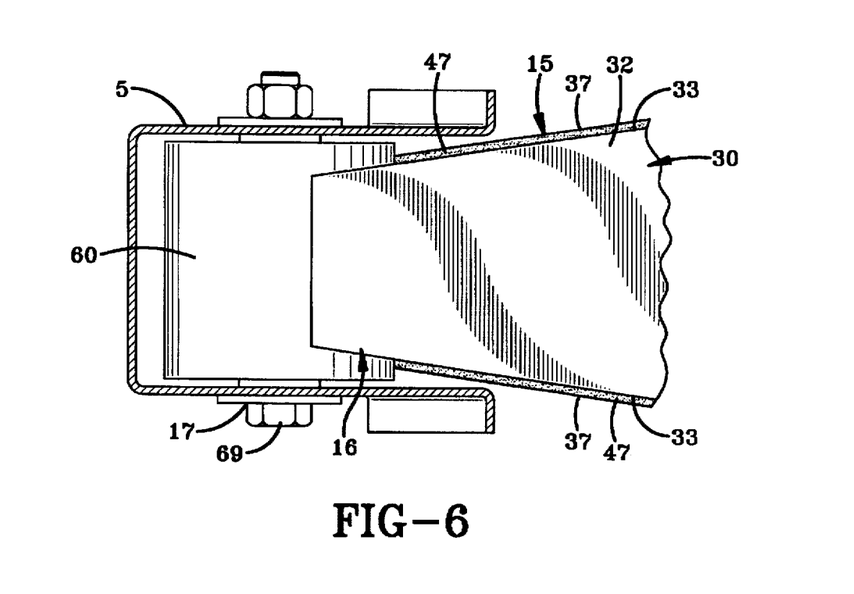
FIG. 6 is a sectional view taken along line 6—6, FIG. 2.
Figure 8:
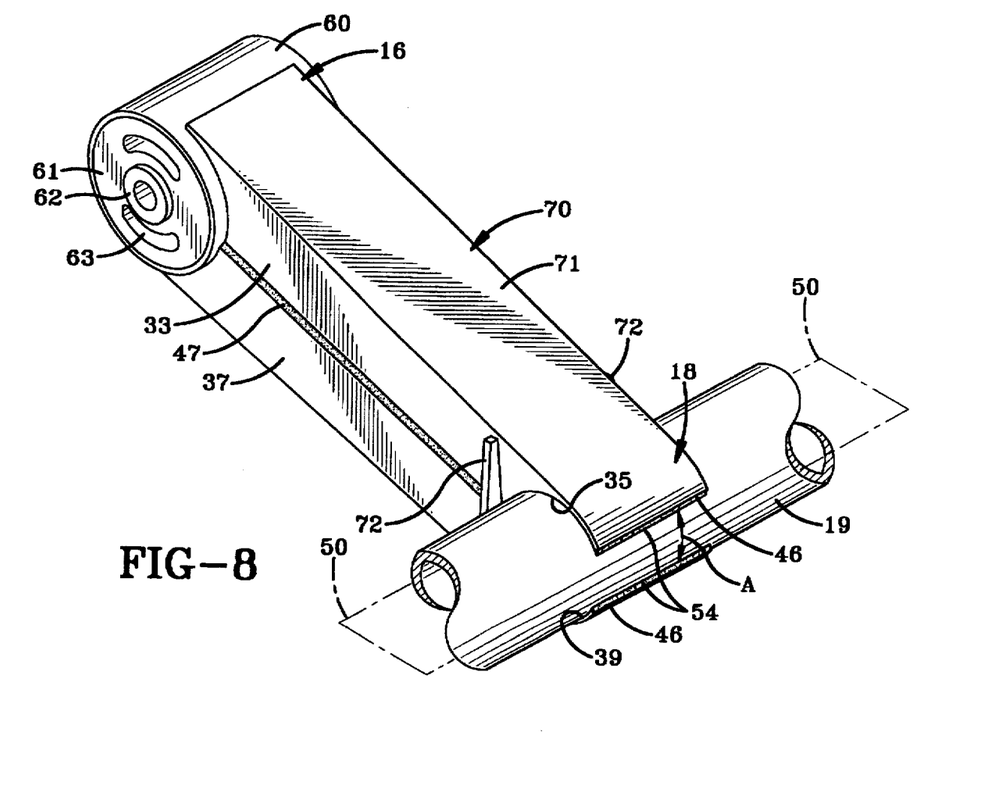
FIG. 8 is an enlarged perspective view of one beam of a second embodiment of the present invention shown with the axle broken away and in section.

Axle 19 is formed with a neutral plane (FIGS. 1, 4, 7 and 8) 50, a top half 51, a bottom half 52 and a rear arcuate section 53 which includes a portion of top half 51 and bottom half 52 as is indicated more particularly by arrow A in FIGS. 2, 4 and 8. Neutral plane 50 extends through the center of axle 19, and represents that portion of axle 19 which experiences the smallest strain in response to the bending moments applied to axle 19 from tire-wheel assemblies 21 (FIGS. 5 and 6). Axle recess 35 of top section 30 is complementary related to a portion of top half 51 of axle 19. Similarly, axle recess 39 of bottom section 31 is complementary related to a portion of bottom half 52 of axle 19. Axle 19 is thus positioned intermediate top section 30 and bottom section 31 and within axle recesses 35 and 39 respectively. Trailing edges 46 of top section 30 and bottom section 31 remain spaced apart when axle 19 is positioned within axle recesses 35 and 39 thus exposing arcuate section 53 of axle 19 as shown more specifically in FIG. 4. A horizontal weld 54 then extends along each trailing edge 46 of top section 30 and bottom section 31 securing axle 19 within axle recesses 35 and 39 respectively. Additionally, a weld 55 extending transverse to the longitudinal direction of axle 19 and secures sidewalls 33 and 37 to axle 19 adjacent weld 47 to further secure axle 19 to trailing beams 15 (FIG. 5).

A center plate 56 is mounted intermediate sidewalls 33 and extends into bottom section 31 adjacent axle 19. As shown in FIGS. 5 and 7, center plate 56 is welded to axle 19 at a weld 57 intermediate sidewalls 35.

Arcuate edges 34 and 38 are complementary related to a bushing sleeve 60 and are welded thereto. A bushing 61 (FIG. 7) is interference fitted within bushing sleeve 60 and an inner sleeve 62 is mounted within bushing 61. Bushing 61 is a tri-functional bushing such as that described in U.S. Pat. No. 4,166,640 and provides a pair of voids 63 to assure that the spring rate in the vertical direction is smaller than the spring rate in the horizontal direction to provide a roll stable suspension while remaining resistance to forces imparted on the suspension system along the longitudinal axis of the beam. As shown in FIG. 1, a pivot pin 69 extends through inner sleeve 62 to mount trailing beam 15 to hanger bracket 5.

In operation, welds 47, 54 and 57 secure axle 19 within axle recesses 35 and 39 of top section 30 and bottom section 31 respectively. Trailing edges 46 terminate short of neutral plane 50 to expose arcuate section 53 of axle 19 thereby assuring that axle 19 will deflect as a result of torque loads input thereto from tire wheel assemblies 21. Bushing 61 provides roll flexibility to vehicle 2, while maintaining a high spring rate in the horizontal direction to prevent longitudinal deflection of suspension system 1.

As is apparent from a review of FIGS. 1–7, suspension system 1 is roll stable, and resistant to deflections as a result of longitudinal forces imparted on trailing beams 15. Additionally, suspension system 1 is lightweight as a result of the rigid axle to beam connection whereby axle 19 is retained within axle recesses 35 and 39 with top section 30 and bottom section 31 being mounted to axle 15 in such a manner as to assure that arcuate section 53 is open and subject to deflection. Suspension system 1 is also easy to assemble as trailing beam 15 is assembled around axle 19 and does not require the manufacturer to slide an axle through apertures formed within each trailing beam.

In accordance with a second embodiment of the present invention, a portion of the suspension system is indicated generally at 70 and is shown particularly in FIG. 8. Suspension system 70 is similar to suspension system 1 in that it includes an axle 19, bushing sleeve 60, a bushing 61 and an inner sleeve 62. Suspension system 70 also includes a pair of trailing beams 71 (one shown) similar to trailing beams 15 of the first embodiment of the invention except that they are not tapered from first end 16 to second end 18. Additionally, a pair of mounting flanges 72 are mounted to sidewalls 33 and 37 adjacent axle 19 and center plate 56. Mounting flanges 72 are welded to sidewalls 33 and 37 and to axle 19 to increase the resistance of suspension system 1 to lateral deflection and to further secure axle 19 within axle recesses 35 and 39. While mounting flanges 72 may take a variety of sizes and configurations, in the preferred embodiment mounting flanges 72 are triangular in configuration and are mounted to the exterior of each trailing beam 15. However, mounting flanges 72 may extend through recesses formed in trailing beams 15 and be integrally connected to center plate 56.

Figure 9:
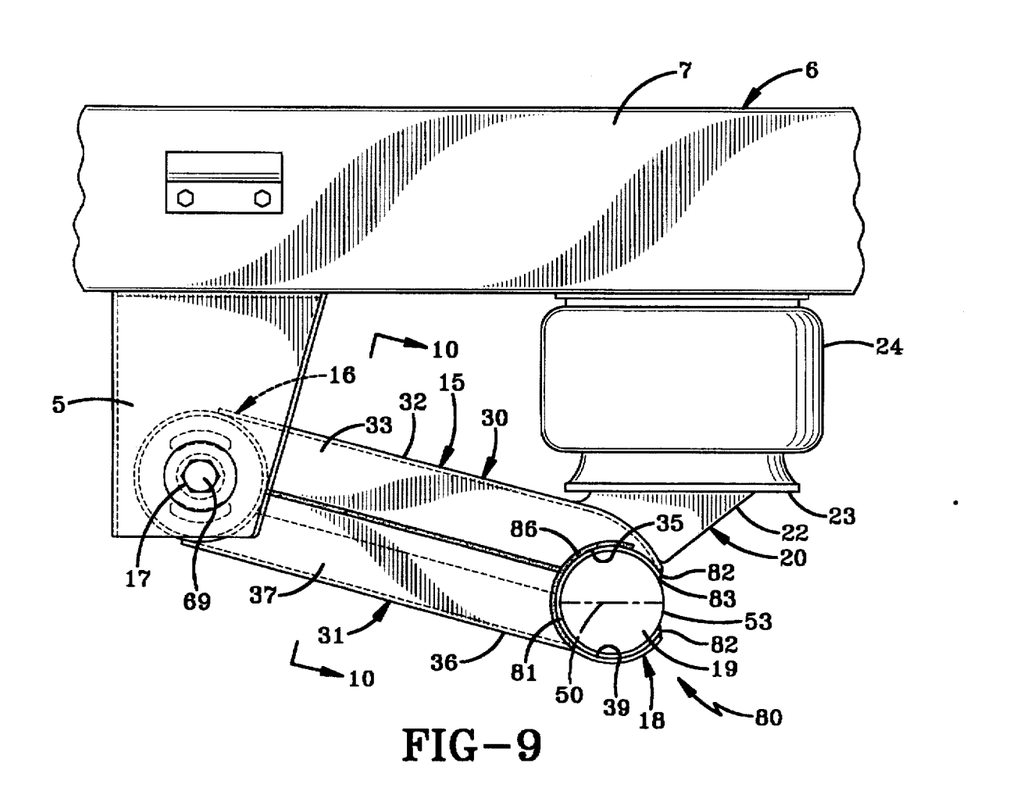
FIG. 9 is a side elevational view of a third embodiment of the present invention shown with portions in dot-dash line.
Figure 10:
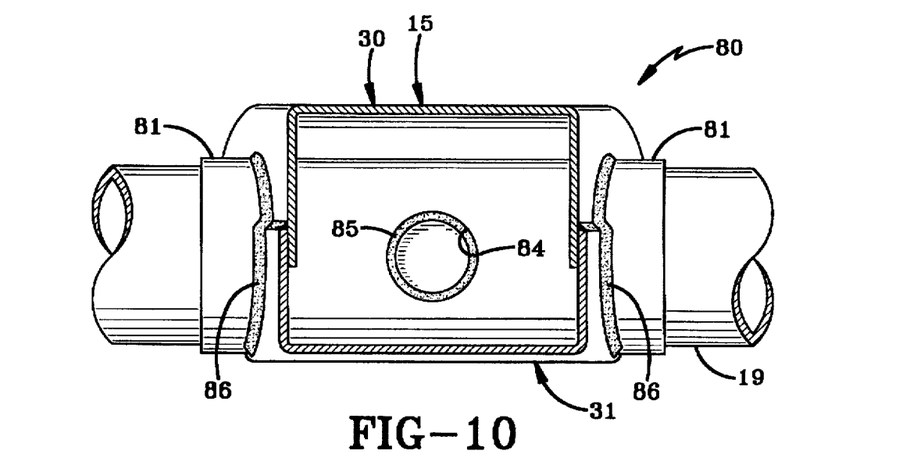
FIG. 10 is a sectional view taken along line 10—10, FIG. 9.

A third embodiment of the present invention is indicated generally at 80, and is shown particularly in FIGS. 9 and 10. Suspension system 80 is similar to suspension system 1 in that it includes a trailing beam 15 having a top section 30 formed with an axle recess 35 and a bottom section 31 formed with an axle recess 39. However, a split sleeve 81 extends circumferentially around a portion of axle 19 adjacent each trailing beam 15. Each split sleeve 81 is formed with a pair of horizontal edges 82 which remain spaced from neutral plane 50 of axle 19 and on either side of arcuate section 53 such that split sleeve 81 does not overlap arcuate section 53 of axle 19. A weld bead 83 extends horizontally along horizontal edge 82 of each split sleeve 81. Referring to FIG. 10, a hole 84 is cut into each split sleeve 81 adjacent neutral plane 50 of axle 19. A plug weld 85 is positioned around hole 84 and further secures split sleeve 81 to axle 19. In essence, plug weld 84 replaces center plate 56 of the first embodiment of the present invention. Split sleeve 81 thus extends into axle recesses 35 and 39 such that top sections 30 and bottom sections 31 are welded to split sleeves 81 rather than axle 19 as in suspension system 1. Split sleeves 81 extends outwardly on either side of trailing beams 15. A weld bead 86 extends circumferentially around split sleeve 81 adjacent axle recesses 35 and 39 and secures split sleeve 81 to trailing beams 15. Split sleeve 81 is thus securely welded to axle 19 via welds 83 and 85, and each trailing beam 15 is secured to a split sleeve 81 via welds 86.

In summary, suspension systems 1, 70 and 80 provide rigid axle to beam connection which is easy to assemble and lightweight by providing a trailing beam having a top section 30 formed with an axle recess 35 and a bottom section 31 formed with an axle recess 39 for receiving an axle 19 therebetween. Axle 19 is secured within axle recesses 35 and 39 via a pair of rear welds extending between trailing edges 46 on either side of arcuate section 53 of axle 19. Additionally, a rear plate may extend downwardly from top section 30 intermediate the sidewalls 33 to provide a rear weld adjacent neutral plane 50 of axle 19. In an alternative embodiment, a split sleeve 81 extends circumferentially around a portion of axle 19 and is welded thereto with each trailing beam 15 being secured to a respective split sleeve 81.

Accordingly, the improved suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved suspension system is constructed and used, the characteristics of the construction, and the advantageous, new and useful results obtained; the new and useful structures, devices, elements, arrangements, parts and combinations, are set forth in the appended claims.

I claim:

1. A suspension system for use with vehicles having a frame, the suspension system comprising:

a pair of spaced apart beams, each having a first end, a second end, a top section and a bottom section;

each top section and bottom section having a pair of sidewalls;

pivot means attached to the first end of each beam for pivotally mounting each beam to the frame;

weld means extending longitudinally along each beam intermediate the first end and the second end for attaching the sidewalls of the top section to the sidewalls of the bottom section;

an axle; and connection means for connecting the axle to each beam adjacent the second end of each beam.

2. The suspension system as defined in claim 1 in which each top section and each bottom section is formed with an axle recess complementary related to a portion of the axle; and in which the axle is mounted within the axle recesses of both the top section and the bottom section of the beam.

3. The suspension system as defined in claim 2 in which the axle has a top half and a bottom half; in which the axle recess formed in the top section is complementary related to a portion of the top half of the axle; in which the axle recess of the bottom section is complementary related to a portion of the bottom half of the axle; and in which the axle is interposed between the top section and bottom section.

4. The suspension system as defined in claim 3 in which the axle has a arcuate section; and in which the second end of the top section and the bottom section are spaced apart adjacent the arcuate section of the axle.

5. The suspension system as defined in claim 4 in which the top section is formed with a top wall; in which the bottom section is formed with a bottom wall; and in which the top wall and the bottom wall form at least a portion of the axle recesses.

6. The suspension system as defined in claim 5 in which the axle recesses are arcuate.

7. The suspension system as defined in claim 2 in which the top section and bottom section are each formed with a pair of sidewalls; in which the sidewalls of one of the top section and the bottom section are spaced apart a distance sufficient to accept the sidewalls of the other of the top section and the bottom section therebetween; and in which the weld means extends along the sidewalls thereby attaching the top section to the bottom section.

8. The suspension system as defined in claim 7 in which a center plate extends intermediate the sidewalls of one of the top sections and bottom sections; and in which the plate is welded to the axle.

9. The suspension system as defined in claim 1 in which each beam is formed with a neutral plane; and in which the weld means extends longitudinally along the beam adjacent the neutral plane.

10. The suspension system as defined in claim 2 in which a bushing sleeve is mounted intermediate the top section and bottom section adjacent the first end; in which a bushing is mounted within the bushing sleeve; and in which a pivot pin extends through the bushing to pivotally mount the beam to the frame.

11. The suspension system as defined in claim 10 in which the bushing is formed with a first spring rate in the vertical direction and a second spring rate in the horizontal direction; and in which the second spring rate is larger than the first spring rate.

12. The suspension system as defined in claim 11 further comprising voids formed in the bushing for reducing the spring rate in the vertical direction relative to the spring rate in the horizontal direction.

13. The suspension system as defined in claim 8 in which one side flange is attached to the sidewall of each beam and to the axle for strengthening the connection therebetween.

14. The suspension system as defined in claim 13 in which the side flanges are integral with the center plate.

15. The suspension system as defined in claim 2 in which both the top section and the bottom section are tapered outwardly from the first end toward the second end.

16. The suspension system as defined in claim 2 in which a half sleeve extends partially circumferentially around the axle; and in which the half sleeve is received within at least a portion of the axle recess of the top section and the bottom section of each beam.

17. The suspension system as defined in claim 16 in which the sleeve extends outwardly beyond the sidewalls of the top section and the bottom section.

18. The suspension system as defined in claim 17 in which one half sleeve is mounted to the axle adjacent each beam; in which each sleeve is formed with a pair of edges; in which each edge is welded to the axle; and in which the axle recess formed in the top section and the bottom section of each beam is complementary related to the sleeve and is welded thereto.

19. The suspension system as defined in claim 18 in which each sleeve is formed with a hole intermediate the edges; and in which a plug weld is placed within the hole further attaching the axle to each sleeve.

20. The suspension system as defined in claim 19 in which the axle is formed with a neutral axis; and in which the plug weld is positioned intermediate the sidewalls of the top section and the bottom section and adjacent the neutral axis of the axle.

* * * * *